United States Patent [19]

Warner

[11] 4,450,503

[45] May 22, 1984

[54] POWER OUTLET FACILITY

[75] Inventor: Michael J. Warner, Yorba Linda, Calif.

[73] Assignee: Myers Electric Products Inc., Montebello, Calif.

[21] Appl. No.: 425,483

[22] Filed: Sep. 28, 1982

[51] Int. Cl.³ .............................................. H02B 1/04
[52] U.S. Cl. .................................... 361/356; 361/365; 361/372
[58] Field of Search .................... 200/51 R, 310, 317; 361/357, 358, 361, 363–365, 368–371, 390, 391, 427, 356, 334, 372–374; 339/22 B, 198 N

[56] References Cited

U.S. PATENT DOCUMENTS

| | | | |
|---|---|---|---|
| 3,341,268 | 9/1967 | Bickford | 361/364 |
| 3,366,845 | 1/1968 | Esler | 361/365 |
| 3,691,288 | 9/1972 | Sturdivan | 361/357 |

*Primary Examiner*—C. P. Tolin

*Attorney, Agent, or Firm*—Sellers and Brace

[57] ABSTRACT

Disclosed is a tamper proof power outlet facility having features of general utility in power outlet facilities generally and, in particular, those serving a pair of adjacent power consumers, such as adjacent boat slips, mobile trailer parking sites etc. The sheet metal housing has metal sockets suspended between the inner side of a cover for the meter compartment and the inner side of the housing bottom by fasteners accessible only from the housing front before installation of the meter. A service outlet compartment along one or both sides of the meter compartment houses an area illuminating lamp, a circuit breaker, and a female outlet receptacle accessible for reception or removal of a service cord male connector only by releasing a normally locked cover for the service outlet compartment. The meter or meters, when installed in a respective socket, are anchored against removal by seals and preclude access to fasteners holding the meter compartment cover closed.

9 Claims, 6 Drawing Figures

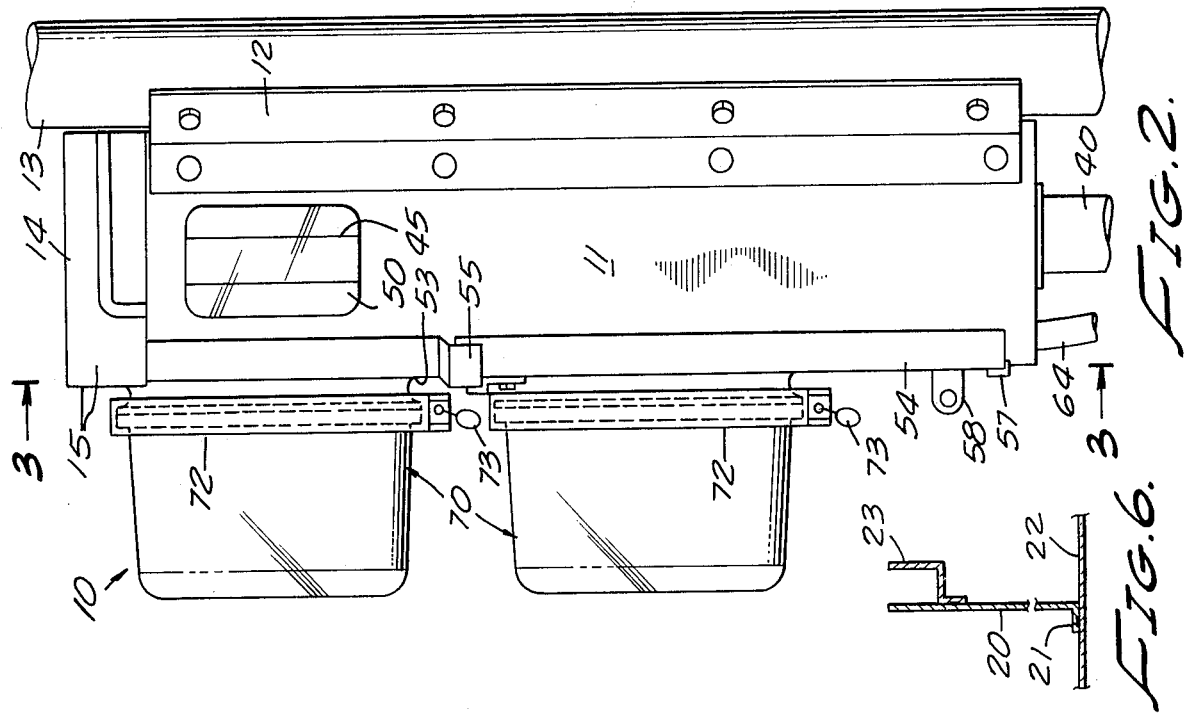
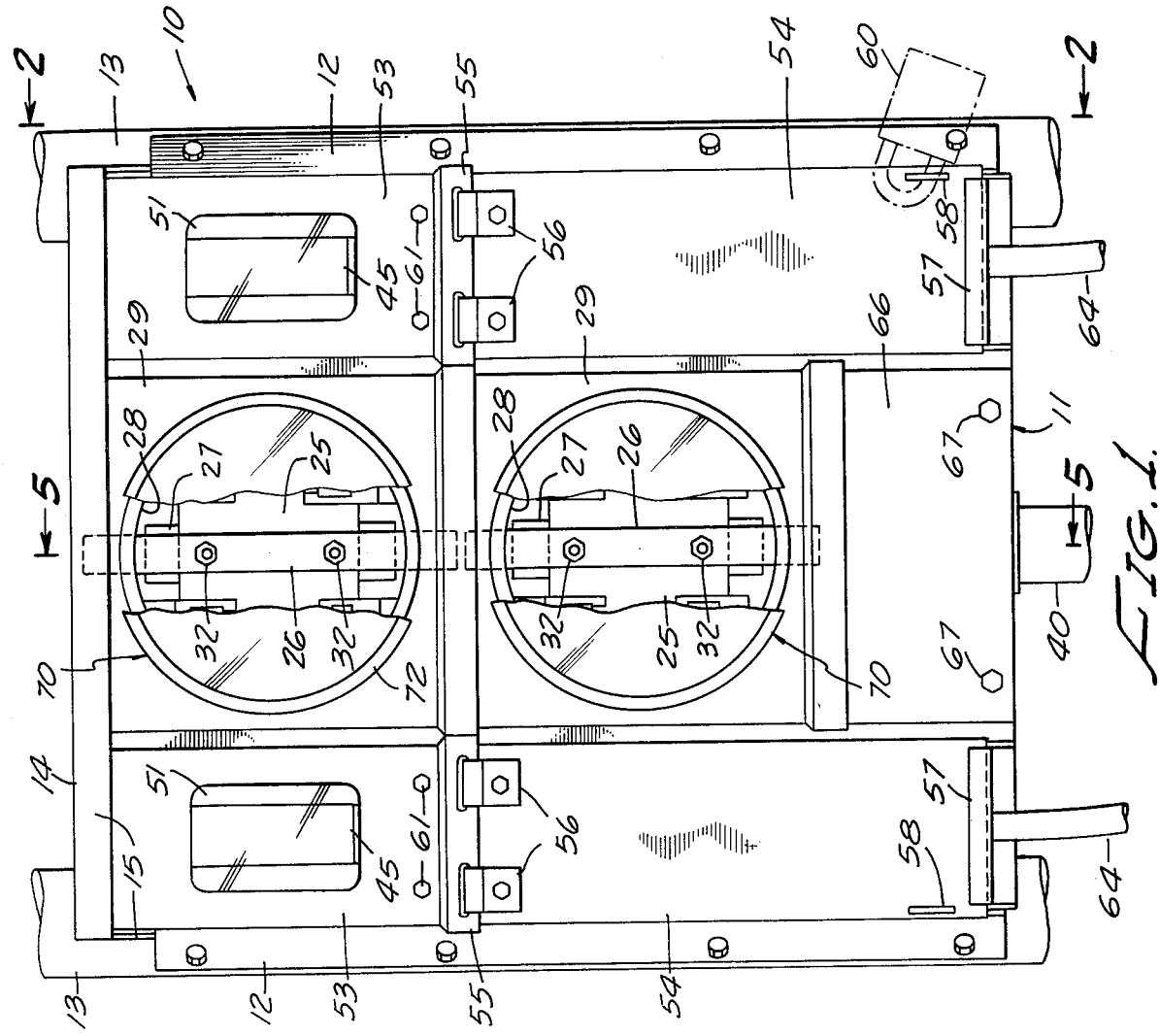

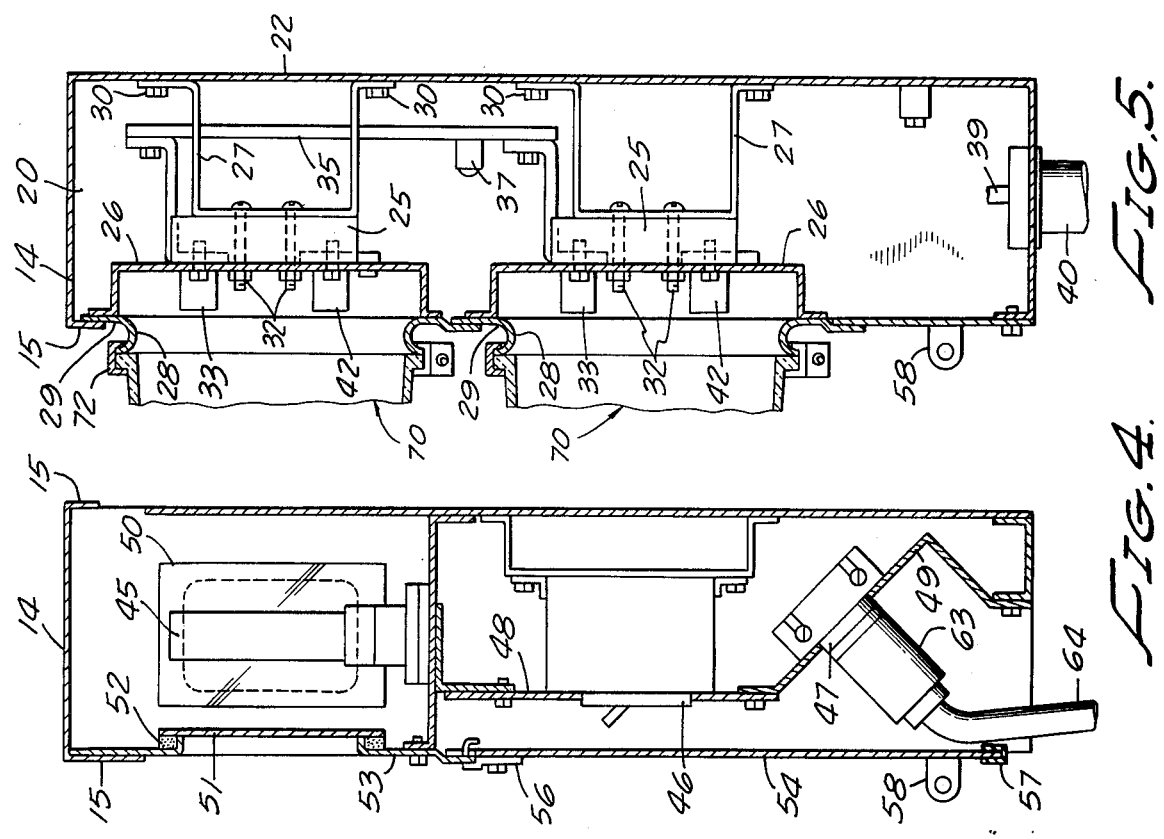
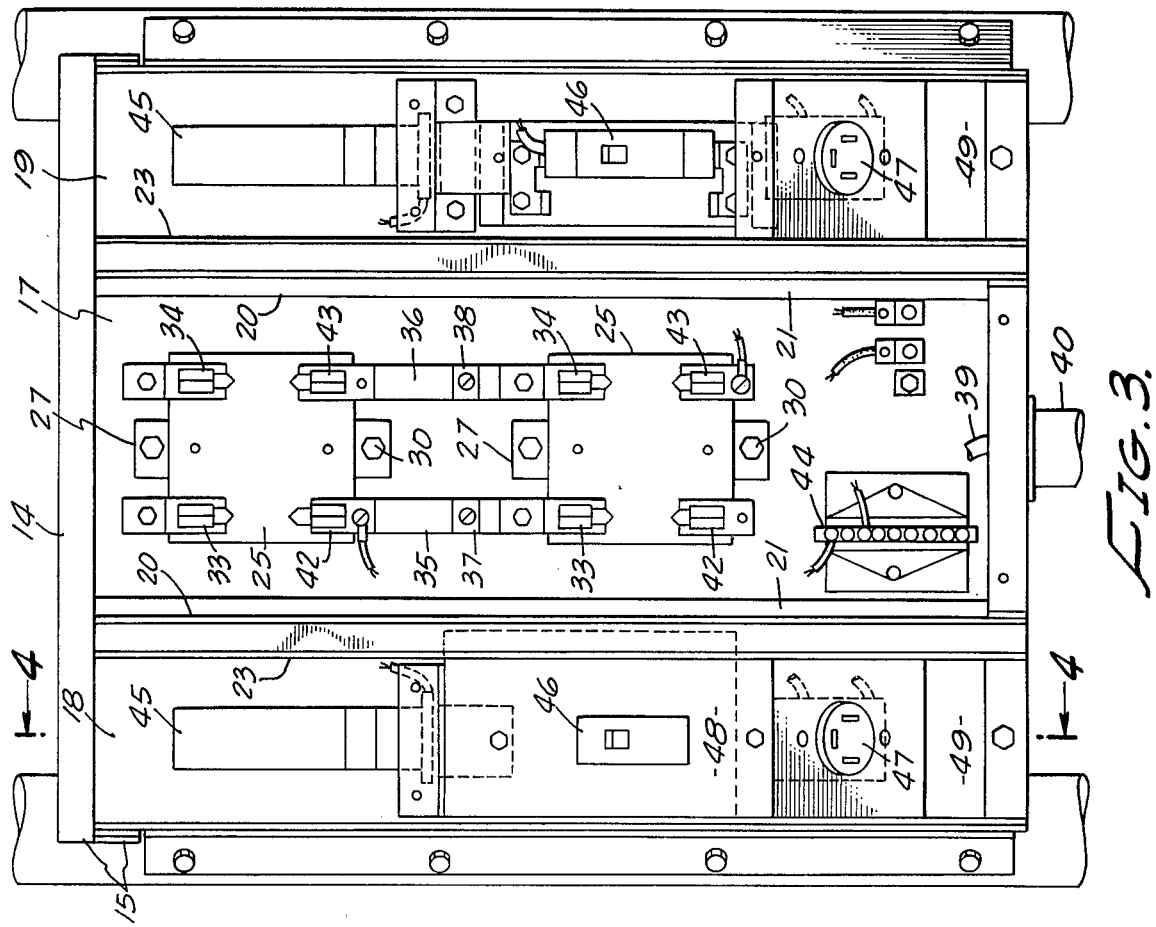

POWER OUTLET FACILITY

This invention relates to power metering facilities, and more particularly to an improved single or dual power outlet facility of unique tamper proof construction and including a separate customer service compartment for each meter having a service power receptacle accessible for the insertion or removal of a service cord only by opening the service compartment cover normally maintained locked by the customer.

BACKGROUND OF THE INVENTION

Many proposals have been made heretofore for both single and dual metered power outlets housed within a single housing and designed to provide reasonably weather proof protection for the housed components. However, all of these are subject to certain disadvantages and shortcomings particularly as respects suitability to provide tamper proof power service to a pair of adjacent consumer sites as, for example, adjacent boat slips, or parking sites for mobile vehicles. Bickford U.S. Pat. No. 3,341,268 and Sturdivan U.S. Pat. No. 3,691,288 each propose a power outlet facility intended to meet the requirements of such consumer sites and each is subject to disadvantages obviated by this invention. For example, Bickford discloses no means for housing his power meters in tamper proof manner and each of his separately metered power outlet receptacles and associated circuit breakers are freely accessible to the public at large. Sturdivan proposes a single metered outlet facility for marina installation which is subject to the serious disadvantages that both the power meter, the circuit breaker and the service cord receptacle are readily accessible to third parties. The circuit breaker and service receptacle cover is slidably supported within the meter cover which is secured to the main housing by readily accessible screws. Esler U.S. Pat. No. 3,366,845 proposes a multi-meter power outlet having a plurality of meters mounted in a tamper proof compartment located between separate rows of service outlet compartments. However, no one of his several compartments is tamper-proof, nor does the facility have provision for connecting service extension cords to individually lockable outlet receptacles and circuit breakers.

SUMMARY OF THE INVENTION

This invention provides a rugged tamper-proof weather tight power outlet facility suitable for outdoor installation to service dual customer sites, such as adjacent boat slips and vehicle parking sites. The main housing has an open front and is divided into a central tamper-proof meter compartment and laterally disposed service outlet compartments each enclosing an area illuminating lamp, a circuit breaker and a service cord receptacle. The meter compartment has a separate apertured cover for each meter. This cover is secured to an associated meter socket by a bracket anchored to the inner side of the cover and the meter socket is further secured to the bottom of the housing by fastener means accessible only through the opening in the cover for the meter. The meter is then anchored assembled to its mounting socket by a sealed clamp embracing the meter and the flanged opening therefor in the cover. Each service outlet compartment is closed by a cover normally maintained closed by the customer's padlock. The service outlet receptacle is so located and constructed relative to this cover that the male connector plug cannot be inserted or withdrawn while the cover is locked closed. The illuminating lamps are housed within the two service outlet compartments and emits light to the surrounding area through tough plastic panelling effective to protect the lamps from vandalism.

Accordingly, it is a primary object of this invention to provide a unique power outlet facility particularly suitable for servicing a pair of adjacent consumer sites and constructed to prevent access to either the meter compartment or the service compartments by unauthorized persons.

Another object of the invention is the provision of a power outlet facility with simple rugged and tamper-proof protection for the meter compartment.

Another object of the invention is the provision of a weather proofed power outlet facility suitable for outdoor installation having a tamper proof meter compartment located between a pair of service outlet compartments each provided with an area illuminating lamp, a circuit breaker and an outlet receptacle usable only when a normally locked cover for the compartment is unlocked by an authorized person.

Another object of the invention is the provision of a power outlet facility having an open faced meter compartment having a cover apertured for reception of the meter and which cover is held in place in a tamper-proof manner by meter socket means secured to the interior of the compartment and to the interior of the cover by fasteners accessible only through the meter assembly opening in the cover and including means for sealing the meter assembled to its socket.

These and other more specific objects will appear upon reading the following specification and claims and upon considering in connection therewith the attached drawing to which they relate.

Referring now to the drawing in which a preferred embodiment of the invention is illustrated:

FIG. 1 is a front elevational view of an illustrative embodiment of the invention power outlet facility with portions of the two meters broken away to show details of the meter socket suspension bracket;

FIG. 2 is a side elevational view taken along line 2—2 on FIG. 1;

FIG. 3 is a front elevational view of the facility housing with all covers detached and the two meters removed;

FIG. 4 is a cross sectional view through one of the service outlet compartments taken along line 4—4 on FIG. 3;

FIG. 5 is a cross sectional view taken along line 5—5 on FIG. 1 showing details of the tamper-proof meter compartment; and FIG. 6 is a fragmentary cross sectional view on a reduced scale through one of the partitions separating the meter and service outlet compartments.

Referring more particularly initially to FIGS. 1 and 2, there is shown an illustrative embodiment of the power outlet facility, designated generally 10, having an open face sheet metal box 11 provided with mounting brackets 12 along its opposite lateral faces for rigidly supporting the same at dockside or elsewhere on upwright pedestals 13. Housing 11 is made of heavy gauge sheet metal and its upper end is closed by a cover 14 having downturned flanges 15 all except the rear one of which is deformed as shown to accommodate insertion of the upper edges of the housing covers as will be explained more fully presently.

As is best shown in FIGS. 3 and 6, the interior of the housing is divided into a central meter compartment 17 and identical laterally disposed service outlet compartments 18 and 19 by vertical partitions 20. These partitions are provided along their lower edge with an outturned flange 21 secured, as by welding, to the bottom 22 of the housing. Welded along the outer upper edge of each partition 20 is a zig-zag strip 23 sufficiently wide to receive freely and without interference the inturned lateral edges of each of the covers for the front of the housing thereby to safeguard against the entry of foreign matter, rain fall and the like. The downwardly extending flange of strip 23 is welded or bonded to partitions 20 in a watertight manner.

A pair of meter sockets 25 of conventional design having an insulated main body are suspended between the housing bottom 22 and its open face by a pair of U-shaped brackets 26, 27. Each of the brackets 26 bridges the outwardly flanged opening 28 in each of the meter compartment covers 29. The outturned legs of brackets 26 are welded to the inner surfaces of covers 29 with their midportions extending across the outer sides of sockets 25. Likewise the outturned inner ends of the U-shaped brackets 27 are secured to the inner surface of the housing bottom by fasteners 30 having self threading shanks. In this manner, the insulated body of meter sockets 25 are sandwiched between the bight portions of the two brackets 26, 27 to which they are rigidly secured by fastener screws 32 accessible for assembly only through the meter receiving ports openings 28 while unoccupied. The assembly operation is carried out by first securing brackets 27 to the bottom of housing 11 by fasteners 30 and thereafter securing one of the meter sockets 25 and its preassembled bracket 26 and cover 29 to bracket 27 by fasteners 32. These fasteners can be assembled only through meter opening 28 in cover 29.

The input terminals 33, 34 of the meter sockets 25 are connected to respective heavy duty bus bars 35, 36 (FIGS. 3 and 5) which have terminal posts 37, 38 to which the power input leads 39 are connected in known manner. These leads enter through metal ducting 40 opening through the lower endwall of housing 11. The meter power output terminals 42, 43 are connected to a terminal block 44 in the meter compartment having leads from each meter socket extending into one of the service outlet compartments and to the components therein.

The identical service outlet compartments 18 and 19 to either side of the meter compartment 17 contain a fluorescent lamp 45, a circuit breaker 46 and a female outlet receptacle 47. These compartments are separated from one another by a partition 48 best shown in FIG. 4, and suitably secured to the interior of the service compartment. This partition includes a downwardly and rearwardly inclined portion 49 adjacent its lower end through which the outlet receptacle 47 extends and is rigidly secured. Fluorescent lamp 45 emits its light through tough transparent plastic windows 50, 51, one of which is located in the sidewall of housing 11 and the other of which is located in the upper front cover for the lamp compartment. Each of these panels is secured over an opening in the housing wall structure and it is held assembled over the window opening in a watertight manner by being bonded to resilient gasket material 52 (FIG. 4).

The service compartments are closed by a pair of covers 53, 54, each having rearwardly extending lateral flanges having a reasonably snug overlapping fit with the outer sidewalls of housing 11 and with the upper edge of strip 23 (FIG. 6) extending along the upper edge of the compartment partition 20. The upper edge of cover 53 is internested beneath the downturned flange 15 of housing cover 14. The lower edge of cover 53 is deformed as indicated at 55 (FIGS. 1 and 2) to overlap the upper edges of the lower cover 54. This deformed edge 55 is slotted as best shown in FIG. 1 to receive the curled over upper edge of a pair of hinge strips 56 secured to the upper edge of cover 54. The bottom edge of each of covers 54 is preferably embraced by a U-shaped strip of resilient non-conductive material 57 to avoid damage to the power service cable extending to the customer's appliances. Lower cover 54 also has a slot in its lower outer corner to receive an apertured tang 58 extending outwardly from the outer sidewall of housing 11. This tang receives the shackle of a padlock 60 to lock the cover closed.

An important feature of the invention is the positioning of receptacle 47 in a downwardly inclined position to avoid collection of moisture and so located relative to the bottom of the compartment and to the compartment cover 54 as to thwart either the insertion or the withdrawal of a male connector 63 of the service cord 64 while the cover is locked closed. This expedient avoids any possibility of unauthorized persons gaining access to the power supply or to the circuit breaker 46 which normally would be left in its open position when the power supply is not in use.

There remains to be described details of the meter compartment covers 29 and the manner in which these are utilized to secure the power meters in their respective sockets. These details are best illustrated in FIGS. 1, 2 and 5 which show the upper cover 29 as having inturned lateral side flanges closely embracing the upper edges of partitions 20 (FIG. 6) and its upper transverse edge is nested beneath the downturned flange 15 of the housing cover 14. Lower cover 29 is similarly constructed and nests within the deformed lower edges of the upper cover 29. Similarly, the outwardly bulged lower edge of lower cover 29 overlaps the upper edge of a cover 66 suitably secured to the housing as by fasteners 67.

Meters 70 are of well known conventional construction having terminals at their backs mating with the socket terminals 33, 34, 42 and 43 of the meter sockets 25. The outturned flange of the transparent covers of these meters seat against the outwardly curled flange forming the meter reception openings 28 of covers 29. A clamping band 72 of known construction clamps the meter cover firmly to covers 29 and is sealed in this assembled position by the usual seal 73. So long as the meters are sealed in their assembled operating position it is impossible to detach the meters or to gain access to the interior of the meter compartment to tamper with the socket or to gain access to the power supply conductors.

In conclusion, it is pointed out that the two lamps 45 at the upper end of the service compartments are preferably turned on automatically by well known photosensitive control means attached to the power line and operable to illuminate the area adjacent the power outlet after sundown. The lamps are mounted within the housing protected against vandalism as are all components of the entire facility.

While the particular power outlet facility herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A power metering facility for metering power to a pair of adjacent power utilizing sites comprising:

a metal box having a bottom, sidewalls and an open top;

partitions dividing said box into an elongated meter compartment and separate customer service compartments along the opposite sides thereof;

a pair of covers for closing respective adjacent portions of said meter compartment and each having an opening sized to accommodate the insertion of a power meter therethrough;

a pair of insulated meter sockets supported adjacent one another in said meter compartment and supported intermediate said box bottom and top by bracket means rigidly secured to the inner side of said bottom and the inner side of an associated one of said pair of covers by means including fasteners accessible for assembly only through said openings in said covers;

bus bars rigidly connected to and supported by said meter sockets; and separate circuit breakers and power service receptacles in each of said customer service compartments connected in circuit with a respective one of said meter sockets.

2. A power metering facility as defined in claim 1 characterized in the provision of illuminating means in each of said service compartments connected to the adjacent one of said circuit breakers and effective to illuminate an area adjacent said metering facility.

3. A power metering facility as defined in claim 1 characterized in the provision of separate access covers for said service compartments having means for locking the same closed and inaccessible to unauthorized persons.

4. A power metering facility as defined in claim 3 characterized in that the outer edge portion of said partitions include outwardly facing channels, the lateral edges of said pair of covers for said meter compartment and of said service compartment access covers having inturned lateral edges positioned to extend into the adjacent one of said channels and over an outer edge portion of said box sidewall when said covers are closed and thereby effective to exclude weather elements.

5. A power metering assembly comprising:

a metal box having a bottom, side walls, and partitions dividing the interior thereof into a central meter compartment and separate service compartments along the opposite side thereof;

a row of meter mounting sockets supported in said central compartment on bracket means secured to said bottom by means manipulatable only from the inner side of said bottom;

cover means for said central compartment secured to respective ones of said meter mounting sockets by means accessible only while an associated meter is detached from said mounting sockets;

said cover means having a meter opening opposite each of said sockets sized to accept a meter therethrough and provided with seal means effective to prevent unauthorized removal of a meter from an associated one of said sockets;

bus bar means rigidly supported by said sockets and isolated from all parts of said central compartment and from said cover means; and separate circuit breakers and separable service cord receptacles in circuit with a respective one of said meter mounting sockets and located in said service compartments and including conductors connecting the same in circuit with the outlet side of an associated one of said meter sockets.

6. A power metering assembly as defined in claim 5 characterized in the provision of a partition between each of said service compartments and said meter compartment have an outwardly opening channel along the outer edge thereof, said cover means for said meter compartment having inturned edges along the opposite edges thereof adapted to seat in said channels and having a transverse edge extending downwardly over and against an underlying portion of an adjacent cover, and the opposite lateral edges of said service compartment covers having similar inturned lateral edges some of which are positioned to extend into said channels and others of which are positioned to overlap an outer lateral edge of said box sidewall when said service compartment covers are closed.

7. A power metering assembly as defined in claim 5 characterized in that said service compartments house illuminating means operable to illuminate an adjacent area exteriorly of said metering assembly when in use.

8. A power metering assembly as defined in claim 5 characterized in that said service compartment cover means, when closed, is so positioned relative to the adjacent one of said service cord receptacles as to preclude the insertion therein or removal therefrom of a service cord male connector, and separate means for locking individual ones of said service cover means closed.

9. A power metering assembly as defined in claim 8 characterized in that the sidewall of said service compartments are provided with a downwardly facing opening below an adjacent one of said service cord receptacles.

* * * * *